(12) United States Patent
Feng et al.

(10) Patent No.: US 10,936,938 B2
(45) Date of Patent: Mar. 2, 2021

(54) METHOD FOR VISUALIZING NEURAL NETWORK MODELS

(71) Applicant: International Business Machines Corporation, Armonk, NY (US)

(72) Inventors: Minwei Feng, Yorktown Heights, NY (US); Yufei Ren, Somers, NY (US); Yandong Wang, Chicago, IL (US); Li Zhang, Yorktown Heights, NY (US); Wei Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 15/857,587

(22) Filed: Dec. 28, 2017

(65) Prior Publication Data

US 2019/0205728 A1    Jul. 4, 2019

(51) Int. Cl.
*G06F 3/048* (2013.01)
*G06F 3/0482* (2013.01)
(Continued)

(52) U.S. Cl.
CPC ............ *G06N 3/04* (2013.01); *G06F 16/904* (2019.01); *G06N 3/0454* (2013.01); *G06N 3/105* (2013.01)

(58) Field of Classification Search
CPC ............ G06F 11/3006; G06F 11/3409; G06F 11/3433; G06F 9/505
See application file for complete search history.

(56) References Cited

U.S. PATENT DOCUMENTS 5,664,106 A * 9/1997 Caccavale ............... G06F 11/32
                                                                          709/224
5,980,096 A * 11/1999 Thalhammer-Reyero ....................
                                                                          G05B 17/02
(Continued)

FOREIGN PATENT DOCUMENTS

CN        106709532 A    5/2017

OTHER PUBLICATIONS

Gunel, "GoogleNet: Going deeper with convolutions," Student Presentation for BIL 722, Hacettepe University (Turkey), Mar. 1, 2016, http://web.cs.hacettepe.edu.tr/~aykut/classes/spring2016/bil722/slides/w04-GoogLeNet.pdf.

(Continued)

*Primary Examiner* — Jordany Nunez
(74) *Attorney, Agent, or Firm* — Anthony Curro; Otterstedt, Wallace & Kammer, LLP

(57) ABSTRACT

A method for providing a graphical visualization of a neural network to a user is provided. The method includes generating the graphical visualization of the neural network at least in part by: representing layers of the neural network as respective three-dimensional blocks, wherein at least a first dimension of a given block is proportional to a computational complexity of a layer of the neural network represented by the given block; and representing data flows between the layers of the neural network as respective three-dimensional structures connecting blocks representing the layers of the neural network, wherein a first dimension of a given structure is proportional to each of a first dimension and a second dimension of a data flow represented by the given structure. The method also includes displaying the graphical visualization of the neural network to the user.

20 Claims, 10 Drawing Sheets

(51) Int. Cl.
  *G06F 3/0484* (2013.01)
  *G06N 3/04* (2006.01)
  *G06F 16/904* (2019.01)
  *G06N 3/10* (2006.01)

(56) References Cited

U.S. PATENT DOCUMENTS

| | | | | |
|---|---|---|---|---|
| 9,330,736 | B2* | 5/2016 | Michalak | G06F 12/10 |
| 9,461,876 | B2* | 10/2016 | Van Dusen | G06N 5/02 |
| 9,544,399 | B2* | 1/2017 | Bragstad | H04L 41/22 |
| 9,753,949 | B1 | 9/2017 | Malpani et al. | |
| 2010/0110932 | A1* | 5/2010 | Doran | H04L 41/12 |
| | | | | 370/254 |
| 2017/0262433 | A1 | 9/2017 | Chester et al. | |
| 2017/0351401 | A1* | 12/2017 | Pascale | G06F 16/248 |
| 2018/0095632 | A1* | 4/2018 | Leeman-Munk | G06F 3/04812 |

OTHER PUBLICATIONS

Lai et al, "Deep Convolutional Neural Network Inference with Floating-point Weights and Fixed-point Activations," Mar. 8, 2017, https://arxiv.org/pdf/1703.03073.pdf.

Zeiler et al, "Visualizing and Understanding Convolutional Networks," 13th European Conference on Computer Vision (ECCV) 2014, Part I, Lecture Notes in Computer Science (LNCS) 8689, Sep. 2014, p. 818-833, https://cs.nyu.edu/~fergus/papers/zeilerECCV2014.pdf.

Szegedy et al, "Going Deeper with Convolutions," 2015 IEEE Conference on Computer Vision and Pattern Recognition (CVPR), Jun. 2015, p. 1-9.

Ng et al, "Beyond Short Snippets: Deep Networks for Video Classification," 2015 IEEE Conference on Computer Vision and Pattern Recognition (CVPR), Jun. 2015, p. 4694-4702.

Rajpurkar, "Visualizing a Convolutional Neural Network's Predictions: Learnings from a few papers," Sep. 18, 2017, 6 pages, https://rajpurkar.github.io/mlx/visualizing-cnns/.

Krizhevsky et al, "ImageNet Classification with Deep Convolutional Neural Networks," Advances in Neural Information Processing Systems 25 (NIPS 2012), Dec. 2012, https://papers.nips.cc/paper/4824-imagenet-classification-with-deep-convolutional-neural-networks.pdf.

Iandola et al, "SqueezeNet: AlexNet-level accuracy with 50x fewer parameters and <0.5MB model size," Nov. 4, 2016, p. 1-13, https://arxiv.org/pdf/1602.07360.pdf.

Szegedy et al, "Inception-v4, Inception-ResNet and the Impact of Residual Connections on Learning," Proceedings of the Thirty-First AAAI Conference on Artificial Intelligence (AAAI-17), Feb. 2017, p. 4278-4284, https://www.aaai.org/ocs/index.php/AAAI/AAAI17/paper/download/14806/14311.

He et al, "Deep Residual Learning for Image Recognition," 2016 IEEE Conference on Computer Vision and Pattern Recognition (CVPR), Jun. 2016, p. 770-778.

Sridhar, "ArtNet—IBM OpenPOWER Cognitive Cup Winning talk," International Conference for High Performance Computing, Networking, Storage and Analysis (SC '16), Nov. 2016, https://speakerdeck.com/psbots/artnet-ibm-openpower-cognitive-cup-contest-winning-talk.

Jia et al, "Caffe: Convolutional Architecture for Fast Feature Embedding," Proceedings of the 22nd ACM International conference on Multimedia (MM '14), Nov. 2014, p. 675-678.

Long et al, "Fully Convolutional Networks for Semantic Segmentation," 2015 IEEE Conference on Computer Vision and Pattern Recognition (CVPR), Jun. 2015, p. 3431-3440.

Lin et al, "Network in Network," International Conference on Learning Representations (ICLR) 2014, Mar. 2014, 10 pages, https://arxiv.org/pdf/1312.4400.pdf.

Simonyan et al, "Very Deep Convolutional Neueral Networks," International Conference on Learning Representations (ICLR) 2015, Apr. 2015, 10 pages, https://arxiv.org/pdf/1409.1556.pdf.

Yuhas et al, "Going Deeper with Covolutions," Student Presentation for CIS 601, Cleveland State University (Ohio), May 2, 2017, 12 pages, http://cis.csuohio.edu/~sschung/CIS601/Cis%20601%20Presentation%202-2%20Going%20Deeper%20With%20Convolutions.pdf.

Krizhevsky et al, "ImageNet Classification with Deep Convolutional Neural Networks," ImageNet Large Scale Visual Recognition Challenge (ILSVRC), Oct. 2012, 27 pages, http://www.image-net.org/challenges/LSVRC/2012/supervision.pdf.

Tasci et al, "ImageNet Classification with Deep Convolutional Neural Networks," Student Presentation for CS 231B, Stanford University (California), May 18, 2015, 35 pages, http://vision.stanford.edu/teaching/cs231b_spring1415/slides/alexnet_tugce_kyunghee.pdf.

Szegedy et al, "Rethinking the Inception Architecture for Computer Vision," 2016 IEEE Conference on Computer Vision and Pattern Recognition (CVPR), Jun. 2016, p. 2818-2826.

Shelhamer et al, "Fully Convolutional Networks for Semantic Segmentation," IEEE Transactions on Pattern Analysis and Machine Intelligence, v. 39, n. 4, Apr. 2017, p. 640-651.

* cited by examiner

METHOD FOR VISUALIZING NEURAL NETWORK MODELS

TECHNICAL FIELD

The present invention relates to the electrical, electronic and computer arts, and, more particularly, to improvements in visualizing neural network models.

BACKGROUND

Machine learning based on convolutional neural networks (CNNs) are used in a number of fields, such as image classification and speech recognition. Deeper learning, using neural networks with more layers, has been facilitated by the availability of increased computer power and a larger corpus of training data (e.g., obtained from Internet sources). FIGS. 1A, 1B, and 2A-2C are conventional visual representations of CNNs. FIG. 1A is based on page 12 of A. Krizhevsky et al, "ImageNet Classification with Deep Convolutional Neural Networks," ImageNet Large Scale Visual Recognition Challenge (ILSVRC), October 2012, 27 pages, the entire disclosure of which is hereby incorporated by reference herein, and FIG. 1B is based on FIG. 2 of A. Krizhevsky et al, "ImageNet Classification with Deep Convolutional Neural Networks," Advances in Neural Information Processing Systems 25 (NIPS 2012), December 2012, 9 pages, the entire disclosure of which is hereby incorporated by reference herein, both of which describe a deep CNN known as "AlexNet." FIGS. 2A-2C are based on FIG. 3 of C. Szegedy et al, "Going Deeper with Convolutions," 2015 IEEE Conference on Computer Vision and Pattern Recognition (CVPR), June 2015, p. 1-9, the entire disclosure of which is hereby incorporated by reference herein, which describes a deep CNN known as "GoogLeNet."

SUMMARY

A method for providing a graphical visualization of a neural network to a user is provided. The method includes generating the graphical visualization of the neural network at least in part by: representing layers of the neural network as respective three-dimensional blocks, wherein at least a first dimension of a given block is proportional to a computational complexity of a layer of the neural network represented by the given block; and representing data flows between the layers of the neural network as respective three-dimensional structures connecting blocks representing the layers of the neural network, wherein a first dimension of a given structure is proportional to each of a first dimension and a second dimension of a data flow represented by the given structure. The method also includes displaying the graphical visualization of the neural network to the user.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. An illustrative embodiment of the present invention provides a method and system for visualizing neural networks which emphasizes characteristics indicative of resource requirements and/or system performance, which are not quantitatively displayed in existing visualizations. An illustrative embodiment may provide a system-independent view (e.g., using metrics independent of the system configuration on which the neural network is run), for example, with computational complexity based on floating-point operations (FLOPS) and/or memory requirements based on number of parameters and/or size of gradient. Thus, an illustrative embodiment may advantageously provide a more intuitive understanding of data transformations, computation complexities, and parameter sizes.

An illustrative embodiment may additionally or alternatively provide a system-dependent view (e.g., using metrics dependent on the system configuration on which the neural network is run), for example, processing times (e.g., computational costs) and data transfer times (e.g., communication costs) for a specific system and/or network architecture and/or topology. Thus, an illustrative embodiment may advantageously provide a more intuitive understanding of computation times and where time is spent (e.g., bottlenecks), as well as data and parameter transfer times. An illustrative embodiment may also demonstrate how system and/or network architecture and/or topology influences neural network performance, and therefore may be useful in determining an optimal system and/or network architecture and/or topology for training and/or executing a given neural network.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 1A and 1B show conventional visual representations of AlexNet;

DETAILED DESCRIPTION

Although principles of the present invention are primarily discussed herein with reference to convolutional neural networks for image classification, one skilled in the art will understand that embodiments of the inventive techniques may be applied to visualization of neural networks of varying types with different applications.

Figure 1A:
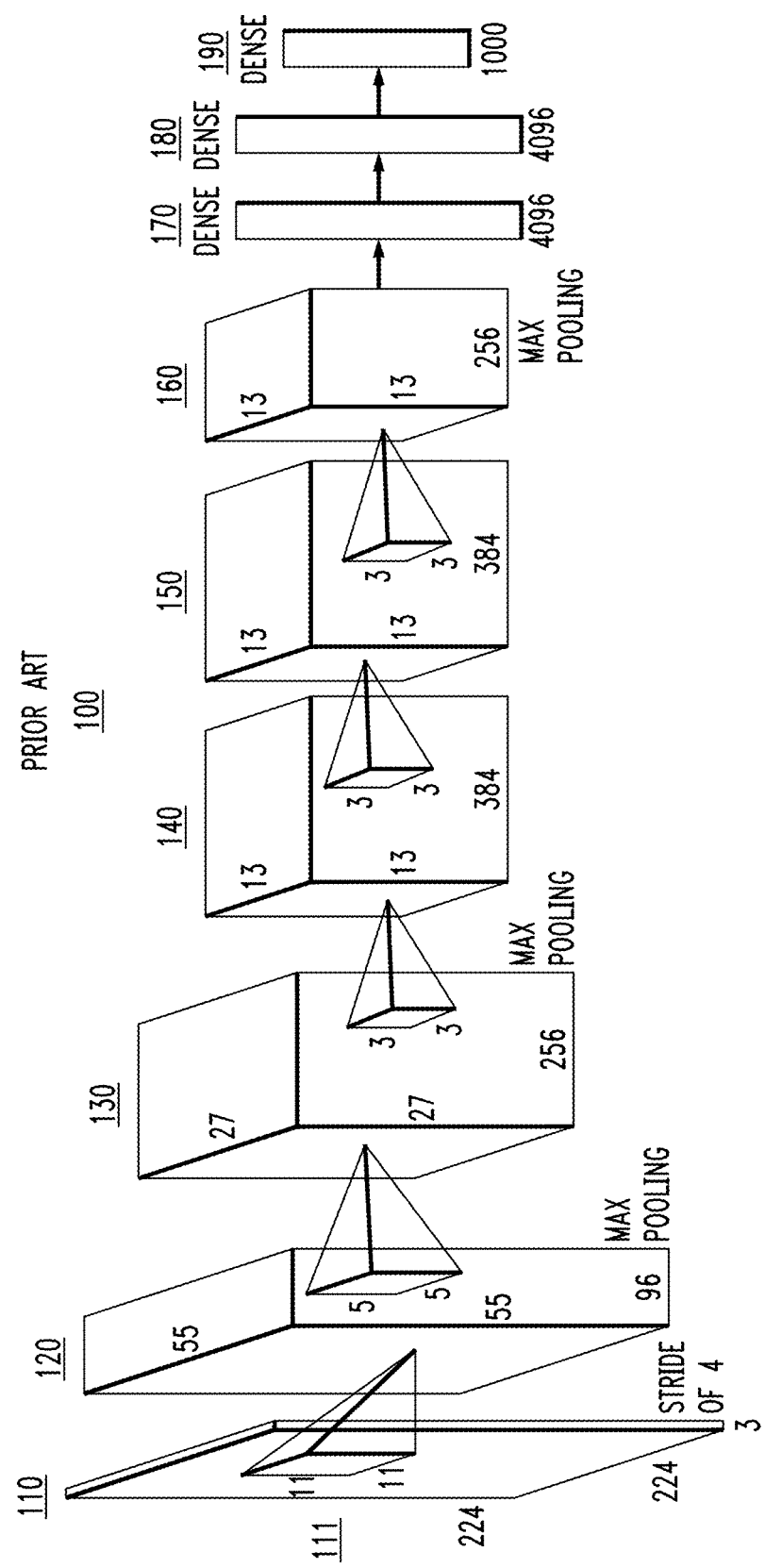

Conventional visual representations of neural networks typically depict features such as data dimensions and transformation types. FIG. 1A is a conventional visual representation of a convolutional neural network AlexNet 100. FIG. 1A shows input image 110, five convolutional layers 120, 130, 140, 150, and 160, and three fully-connected layers 170, 180 and 190. AlexNet 100 has eight weighted layers (e.g., layers with parameters) 120, 130, 140, 150, 160, 170, 180, and 190; thus, AlexNet 100 has a depth of eight. (If one were to include pooling layers as well as weighted layers, AlexNet 100 would have a depth of 11.)

Input image 110 has a height and width of 224 pixels×224 pixels, and a depth of 3 channels (RGB: red, green, and blue), thus having dimensions of 224×224×3, or a total of 150,528 dimensions. Depicted within input image 110 is a moving window 111, having a length and width of 11 pixels×11 pixels, a depth of 3 pixels, and a stride of 4, which provides input to first convolutional layer 120, which is shown with dimensions of 55×55×96. Thus, first convolutional layer (120) filters the 224×224×3 input image (110) with 96 kernels (111) of size 11×11×3 with a stride of 4 pixels. First convolutional layer 120 is followed by a local response-normalization (LRN) layer and a max-pooling layer.

First convolutional layer 120 is shown in FIG. 1A with a depth of 96 and a moving window (kernel) of dimensions 5×5. Second convolutional layer 130 is shown in FIG. 1A with dimensions of 27×27×256, for a total of 186,624 neurons. Thus, second convolutional layer 130 takes as input the (response-normalized and pooled) output of first convolutional layer 120 and filters it with 256 kernels of size 5×5. Second convolutional layer 130 is followed by a local response-normalization (LRN) layer and a max-pooling layer.

Second convolutional layer 130 is shown in FIG. 1A with a depth of 256 and a moving window (kernel) of size 3×3. Third convolutional layer 140 is shown in FIG. 1A with dimensions of 13×13×384, for a total of 64,896 neurons. Thus, third convolutional layer 140 takes as input the (response-normalized and pooled) output of second convolutional layer 130 and filters it with 384 kernels of size 3×3.

Third convolutional layer 140 and fourth convolutional layer 150 are connected to one another without any intervening pooling or normalization layers. Third convolutional layer 140 is shown in FIG. 1A with a depth of 384 and a moving window (kernel) of dimensions 3×3. Fourth convolutional layer 150 is shown in FIG. 1A with dimensions of 13×13×384, for a total of 64,896 neurons. Thus, the fourth convolutional layer 150 in FIG. 1A has 384 kernels of size 3×3.

Fourth convolutional layer 150 and fifth convolutional layer 160 are connected to one another without any intervening pooling or normalization layers. Fourth convolutional layer 150 is shown in FIG. 1A with a depth of 384 and a moving window (kernel) of dimensions 3×3. Fifth convolutional layer 150 is shown in FIG. 1A with dimensions of 13×13×256, for a total of 43,264 neurons. Thus, the fifth convolutional layer 160 in FIG. 1A has 256 kernels of size 3×3.

Fifth convolutional layer 160 is followed by a max-pooling layer, and then by first fully-connected layer 170. First fully-connected layer 170 and second fully-connected layer 180 have 4096 neurons each, the neurons in each fully-connected layer are connected to all neurons in the prior layer. Last fully-connected layer 190 has 1000 neurons and produces an output which is fed to a 1000-way softmax which produces a distribution over the 1000 class labels.

Figure 1B:
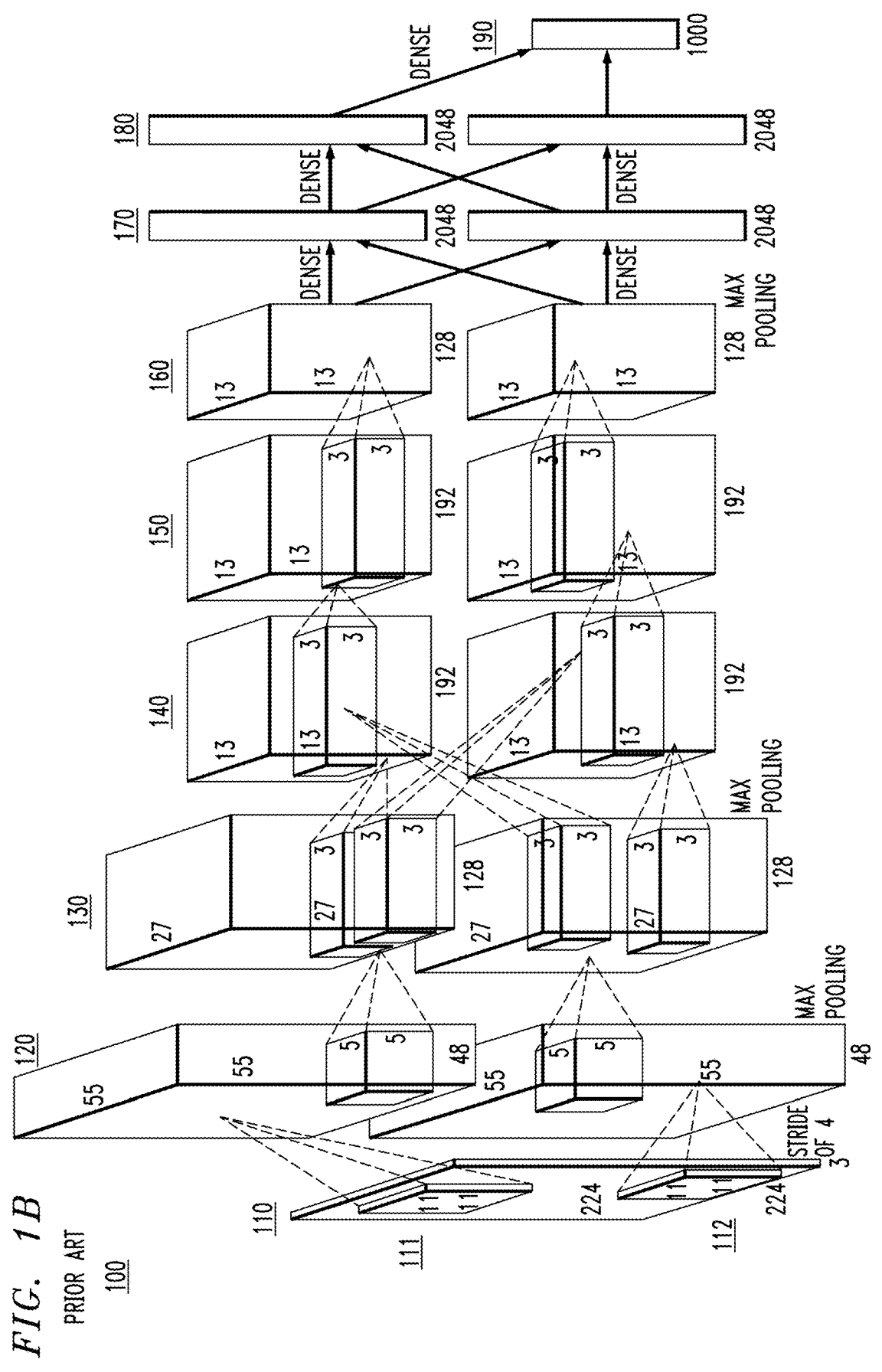

FIG. 1B is another conventional visual representation of the aforementioned convolutional neural network AlexNet 100. As discussed above with regard to FIG. 1A, AlexNet 100 has eight weighted layers 120, 130, 140, 150, 160, 170, 180, and 190, and therefore has a depth of eight. FIG. 1B, like FIG. 1A, shows input image 110, five convolutional layers 120, 130, 140, 150, and 160, and three fully-connected layers 170, 180 and 190. However, in FIG. 1B, each of the hidden layers 120, 130, 140, 150, 160, 170, and 180 are divided into two parts (an upper part and a lower part), with each part executing on a respective graphical processor (GPU). In FIG. 1B, the upper parts of hidden layers 120, 130, 140, 150, 160, 170, and 180 are executed on a first GPU, while the lower parts of hidden layers 120, 130, 140, 150, 160, 170, and 180 are executed on a second GPU.

As with FIG. 1A, input image 110 in FIG. 1B has a height and width of 224 pixels×224 pixels, and a depth of 3 channels (RGB: red, green, and blue), thus having dimensions of 224×224×3. Depicted within input image 110 are two moving windows 111 and 112, each having a length and width of 11 pixels×11 pixels, a depth of 3 pixels, and a stride of 4, which provide respective inputs to the two parts of first convolutional layer 120. Each part of first convolutional layer 120 is shown with dimensions of 55×55×48. Thus, first convolutional layer (120) filters the 224×224×3 input image (110) with 96 kernels (111 and 112) of size 11×11×3 with a stride of 4 pixels. First convolutional layer 120 is followed by a local response-normalization (LRN) layer and a max-pooling layer.

Both parts of first convolutional layer 120 shown in FIG. 1B have a depth of 48 and a moving window (kernel) of dimensions 5×5. Each part of second convolutional layer 130 shown in FIG. 1B takes input only from the part of first convolutional layer 120 on the same GPU. Each part of second convolutional layer 130 is shown in FIG. 1B with dimensions of 27×27×128. The two parts of third convolutional layer 140 collectively include a total of 64,896 neurons. Each part of second convolutional layer 130 takes as input the (response-normalized and pooled) output of a corresponding part of first convolutional layer 120 and filters it with 256 kernels of size 5×5. Second convolutional layer 130 is followed by a local response-normalization (LRN) layer and a max-pooling layer.

Each part of second convolutional layer 130 is shown in FIG. 1B with a depth of 128 and two moving windows (kernel) of dimensions 3×3, each coupled to a respective part of third convolutional layer 140 in FIG. 1B. Thus, the GPUs communicate such that each part of third convolutional layer 130 receives input from each part of second convolutional layer 130. Each part of third convolutional layer 140 is shown in FIG. 1B with dimensions of 13×13×192. The two parts of third convolutional layer 140 collectively include a total of 64,896 neurons. Thus, third convolutional layer 140 takes as input the (response-normalized and pooled) output of first convolutional layer 120 and filters it with 384 kernels of size 3×3.

Third convolutional layer 140 and fourth convolutional layer 150 are connected to one another without any intervening pooling or normalization layers. However, each part of fourth convolutional layer 150 shown in FIG. 1B takes input only from the part of third convolutional layer 140 on the same GPU. Each part of third convolutional layer 140 is shown in FIG. 1A with a depth of 192 and a moving window (kernel) of dimensions 3×3. Each part of fourth convolutional layer 150 is shown in FIG. 1A with dimensions of 13×13×192. The two parts of fourth convolutional layer 150 collectively include a total of 64,896 neurons. Thus, the fourth convolutional layer 150 in FIG. 1B has 384 kernels of size 3×3.

Fourth convolutional layer 150 and fifth convolutional layer 160 are connected to one another without any intervening pooling or normalization layers. However, each part of fourth convolutional layer 150 shown in FIG. 1B takes input only from the part of third convolutional layer 140 on the same GPU. Each part of fourth convolutional layer 150 is shown in FIG. 1B with a depth of 192 and a moving window (kernel) of dimensions 3×3. Each part of fifth convolutional layer 150 is shown in FIG. 1B with dimensions of 13×13×128. The two parts of fourth convolutional layer 150 in FIG. 1B collectively include a total of 43,264 neurons. The fifth convolutional layer 160 in FIG. 1B has 256 kernels of size 3×3.

Fifth convolutional layer 160 is followed by a max-pooling layer, and then by first fully-connected layer 170. First fully-connected layer 170 and second fully-connected layer 180 each include two parts executing on respective GPUs, with each part containing 2048 neurons. However, the neurons in each fully-connected layer are connected to all neurons in the prior layer. Thus, each part of first fully-connected layer 170 receives input from both parts of fifth convolutional layer 160, and each part of second fully-connected layer 180 receives input from both parts of first fully-connected layer 170. Last fully-connected layer 190 has a single part with 1000 neurons, which receives input from both parts of second fully-connected layer 180, and produces an output which is fed to a 1000-way softmax which produces a distribution over the 1000 class labels.

Figure 2A:
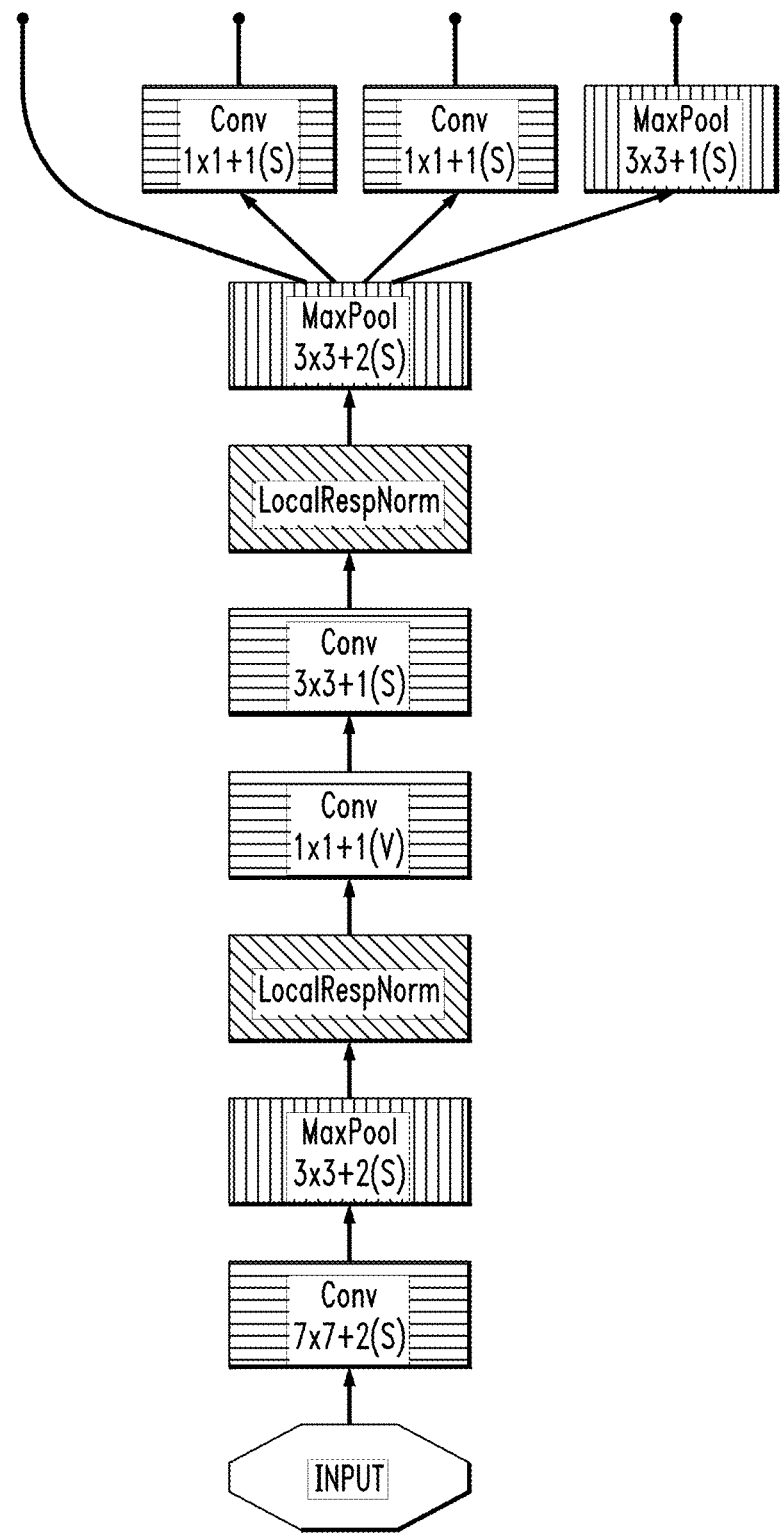
FIGS. 2A-2C show a conventional visual representation of GoogLeNet.
Figure 2B:
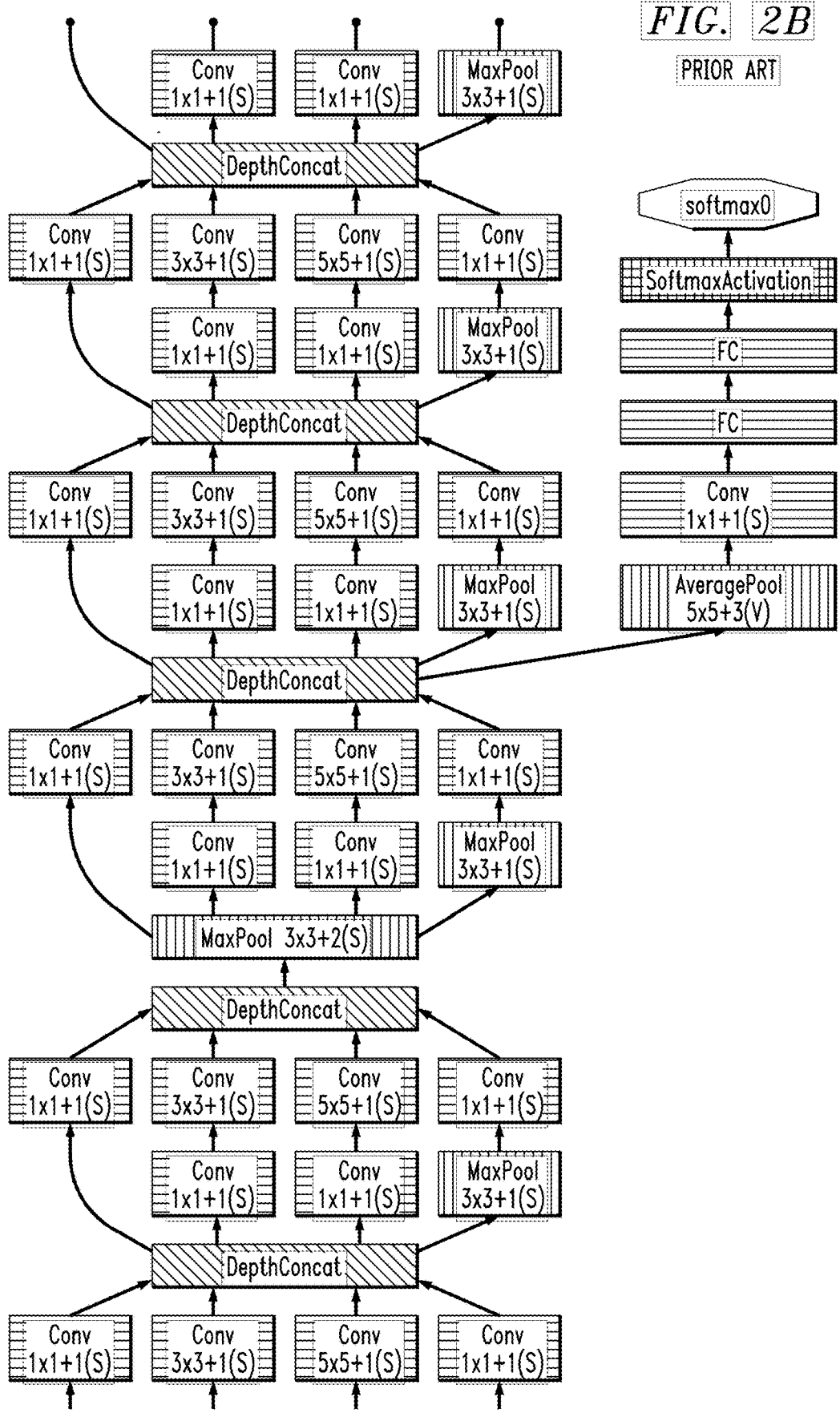
Figure 2C:
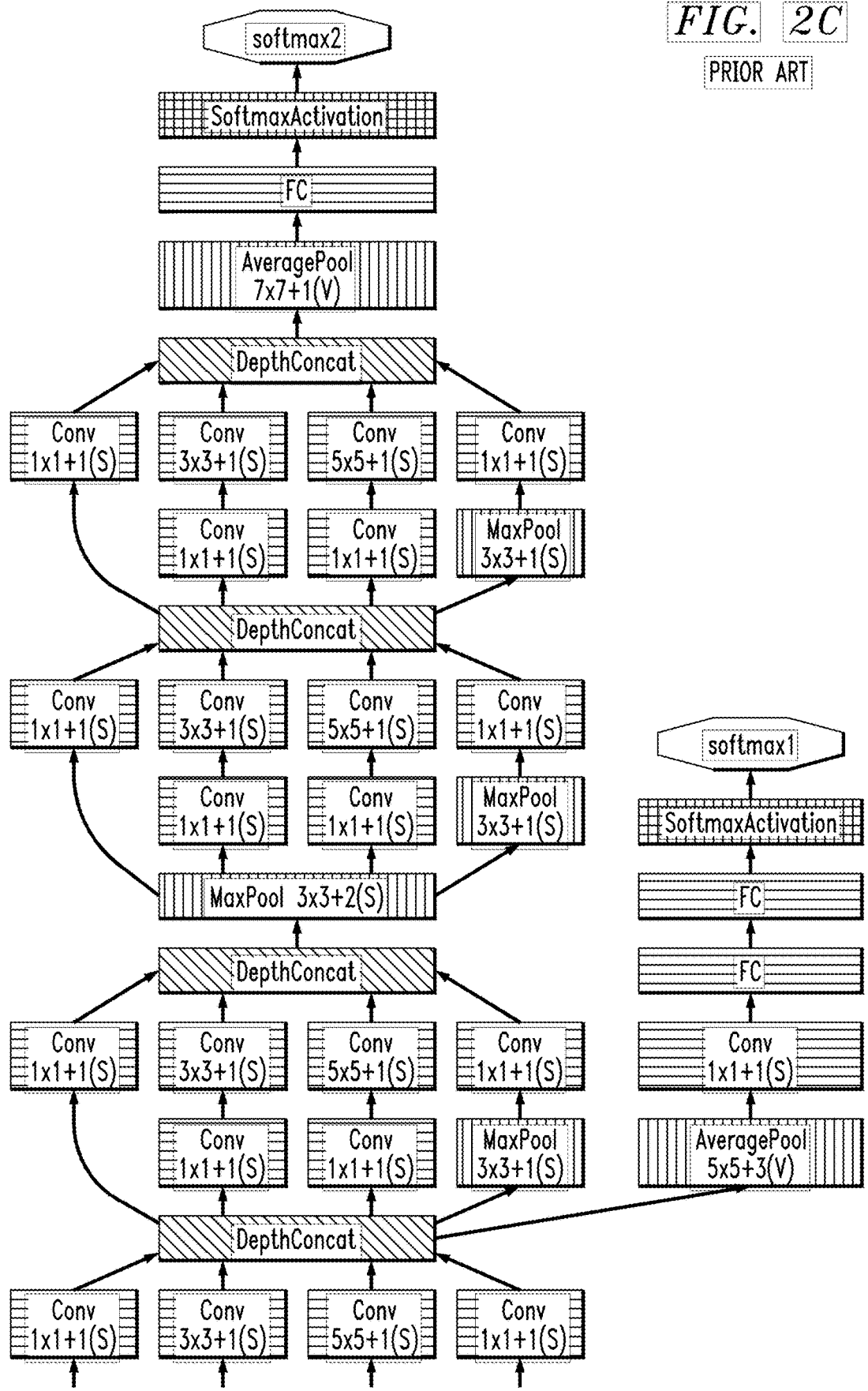

FIGS. 2A-2C collectively form a visual representation of another convolutional neural network GoogLeNet. FIGS. 2A-2C represent a single visual representation which has been divided into three parts on three separate sheets to facilitate greater legibility. GoogLeNet begins with the input shown at the bottom of FIG. 2A. The four output arrows shown on the bottom of FIG. 2A are connected to the four input arrows shown on the FIG. 2B, and the four The four output arrows shown on the bottom of FIG. 2B are connected to the four input arrows shown on the FIG. 2C. Softmax2 at the top of FIG. 2C represents an output classifier, while softmax1 on FIG. 2C and softmax0 in FIG. 2B represent auxiliary classifiers. Whereas the representations shown in FIGS. 1A and 1B emphasized data dimensions, the representation in FIGS. 2A-2C emphasizes the transformations within layers by using different colors for different operations. Thus, in FIGS. 2A-2C, blue boxes represent layers with parameters, such as convolutional ("Cony") or fully-connected ("FC") layers. Red boxes represent pooling layers, such as maximum pooling ("MaxPool") or average pooling ("AvgPool") layers. Green boxes represent local response-normalization ("LocalRespNorm") or depth concatenation ("DepthConcat") layers. Orange boxes represent softmax activation layers ("SoftmaxActivation"). A path from input to classifier output softmax2 in GoogleNet as shown in FIGS. 2A-2C includes 22 layers with parameters (i.e., blue boxes), and therefore GoogleNet is 22 layers deep. If one were to include pooling layers (i.e., red boxes), GoogleNet would be 27 layers deep.

As discussed above with reference to FIG. 1B, neural networks are often executed on graphical processing units (GPUs) in parallel. This poses certain challenges, however. GPUs typically have local memory which is limited relative to central processing units (CPUs). Moreover, execution in parallel on multiple GPUs requires periodic exchange of data to ensure that intermediate and/or final results don't diverge. Thus, there is a need for communication and coordination between GPUs to ensure consistent consensus. However, these periodic exchanges can involve transferring large amounts of data among many GPUs (e.g., 0.5-1.0 gigabytes among 100 GPUs), which can require significant memory and system resources.

Conventional visualizations of neural networks, such as those shown in FIGS. 1A, 1B, and 2A-2C, focus on input and output data (e.g., image) dimensions and/or transformations. These visualizations often fail to capture characteristics which indicate the amount of system resources required by a neural network. However, the memory requirements for a neural network often depend less on the number of weighted layers (i.e., the number of weight matrices) than on the number of parameters and size of gradients (i.e., the size of the weight matrices). As discussed above, FIGS. 1A and 1B show that AlexNet has a depth of 8 weighted layers, and FIGS. 2A-2C show that GoogLeNet has a depth of 22 weighted layers. Thus, one may conclude from these visualizations that GoogLeNet requires more resources (e.g., memory) than AlexNet. However, AlexNet requires 60 million weights and a gradient size of 243 megabytes, while GoogleNet only requires 12 million weights and a gradient size of 53 megabytes.

An illustrative embodiment of the present invention provides a method and system for visualizing neural networks which emphasizes characteristics indicative of resource requirements and/or system performance, which are not quantitatively displayed in existing visualizations. An illustrative embodiment may provide a system-independent view (e.g., using metrics independent of the system configuration on which the neural network is run), for example, with computational complexity based on floating-point operations (FLOPS) and/or memory requirements based on number of parameters and/or size of gradient. Thus, an illustrative embodiment may advantageously provide a more intuitive understanding of data transformations, computation complexities, and parameter sizes.

An illustrative embodiment may additionally or alternatively provide a system-dependent view (e.g., using metrics dependent on the system configuration on which the neural network is run), for example, processing times (e.g., computational costs) and data transfer times (e.g., communication costs) for a specific system and/or network architecture and/or topology. Thus, an illustrative embodiment may advantageously provide a more intuitive understanding of computation times and where time is spent (e.g., bottlenecks), as well as data and parameter transfer times. An illustrative embodiment may also demonstrate how system and/or network architecture and/or topology influences neural network performance, and therefore may be useful in determining an optimal system and/or network architecture and/or topology for training and/or executing a given neural network.

Figure 3A:
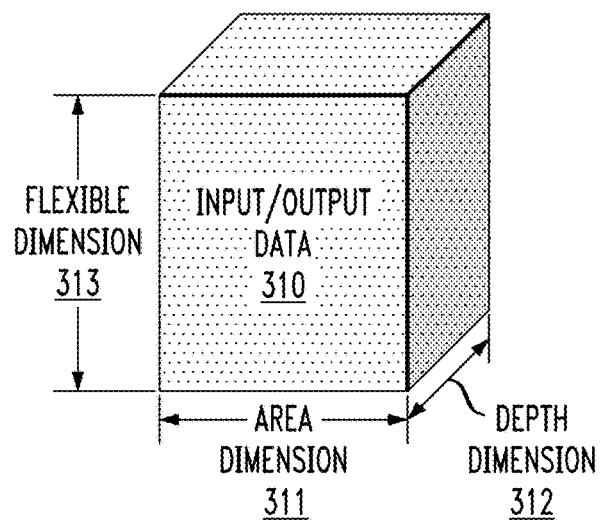
FIGS. 3A-3D show exemplary components within a system-independent view, according to an illustrative embodiment of the present invention.

FIGS. 3A-3D show exemplary components within a system-independent view, according to an illustrative embodiment of the present invention. FIG. 3A shows an exemplary system-independent input/output data component 310, which has stippling. As will be further discussed below with reference to FIGS. 3B-3D, component 310 may represent data input to or output from a layer of a neural network. As will be further discussed below with reference to FIG. 5, component 310 may also represent data output from one layer of a neural network then input into another layer of that neural network. Component 310 includes an area dimension 311, which may represent a total number of pixels in an image, thus using a single scalar dimension to take the place of two dimensions (height and width). Thus, for the image 110 discussed above with respect to FIGS. 1A and 1B, with a height of 224 pixels and a width of 224 pixels, the area dimension 311 may be 50,176—the product of the height and width dimensions. Component 310 includes a depth dimension 312, which may represent a number of channels for each pixel in an image, such as 3 for the RGB (red-green-blue) image 110 discussed above with respect to FIGS. 1A and 1B. Component 310 also includes a flexible dimension 313, which may be any user-selected value. Flexible dimension 313 can be manipulated (e.g., stretched, bent, and/or twisted) within a visualization tool to allow a user to get a more flexible (e.g., customizable) view.

Figure 3B:
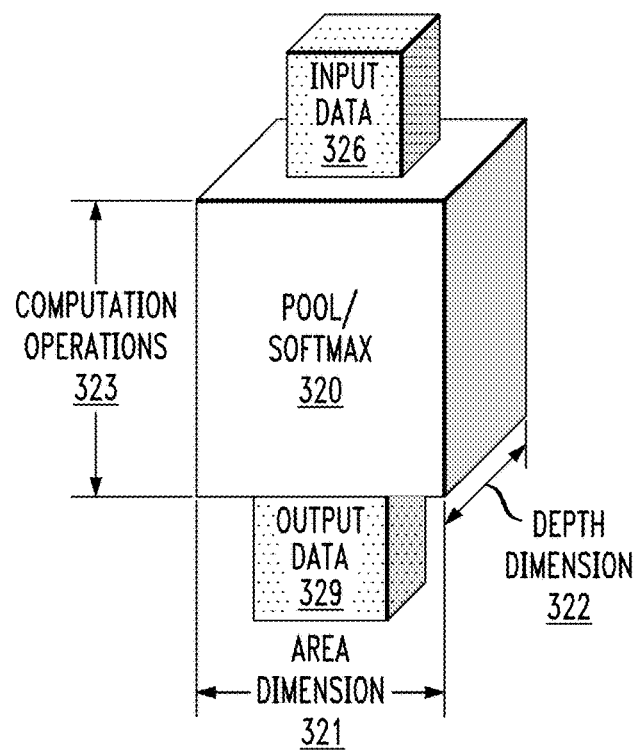

FIG. 3B shows an exemplary system-independent pool/softmax layer component 320. Component 320 may represent a softmax layer, max pool layer, or average pool layer such as those discussed above with reference to FIGS. 1A and 1B and/or with reference to the orange and red boxes in FIGS. 2A-2C. Component 320 includes area dimension 321 and depth dimension 322, which may be similar to the corresponding dimensions 311 and 312 discussed above with reference to FIG. 3A. Component 320 also includes dimension 323 which represents computation complexity in a system-independent manner, such as a number of required computation operations, which may be floating-point operations (FLOPS).

FIG. 3B also includes data components 326 and 329, which represent the input and output of component 320, and which may be similar to data component 310 discussed above with reference to FIG. 3A. Note that components 326 and 329 in FIG. 3B have stippling similar to component 310 in FIG. 3A. In particular, input and output data components 326 and 329 in FIG. 3B may each include dimensions 311, 312, and 313 discussed above with reference to FIG. 3A.

Figure 3C:
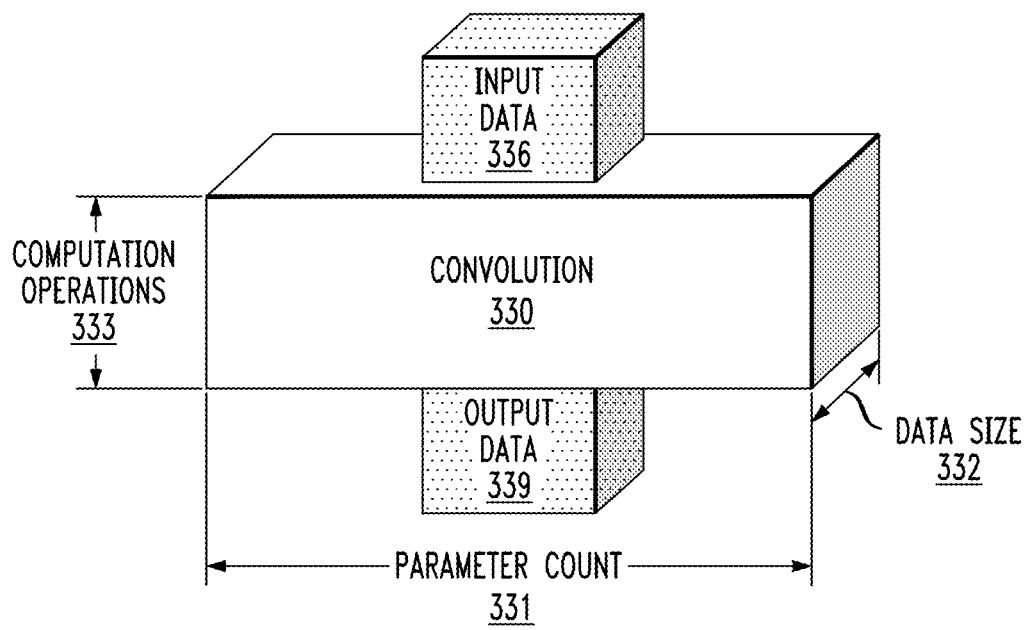

FIG. 3C shows an exemplary system-independent convolution layer component 330. Component 330 may represent a convolution layer such as 120, 130, 140, 150 and 160 discussed above with reference to FIGS. 1A and 1B and/or as discussed above with reference to FIGS. 2A-2C. Component 330 includes parameter count 331, which represents the number of parameters required for the convolution operation in layer 330. Component 330 includes data size 332, which may represent the size of the matrix or gradient required for the convolution operation in layer 330. As discussed above, the number of parameters and the size of the matrix often provide a better indication of the amount of resources (e.g., memory storage) required than the number of weighted operations alone. Component 330 also includes dimension 333 which represents computation complexity in a system-independent manner, such as a number of required computation operations, which may be floating-point operations (FLOPS), as discussed above with reference to FIG. 3A.

FIG. 3C also includes data components 336 and 339, which represent the input and output of component 330, and which may be similar to data component 310 discussed above with reference to FIG. 3A. Note that components 336 and 339 in FIG. 3C have stippling similar to component 310 in FIG. 3A. In particular, input and output data components 336 and 339 in FIG. 3C may each include dimensions 311, 312, and 313 discussed above with reference to FIG. 3A.

Figure 3D:
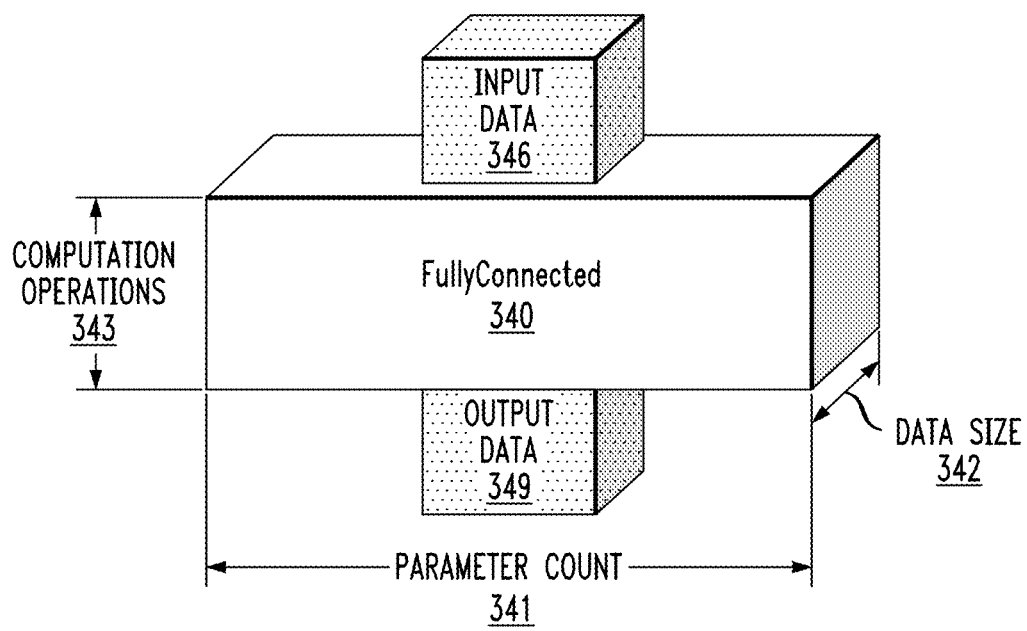

FIG. 3D shows an exemplary system-independent fully-connected layer component 340. Component 340 may represent a fully-connected layer such as 170, 180 and 190 discussed above with reference to FIGS. 1A and 1B and/or as discussed above with reference to FIGS. 2A-2C. Fully-connected layer component 340 in FIG. 3D includes dimensions similar to convolution layer component 330 in FIG. 3C. Thus, component 340 includes parameter count 341, which represents the number of parameters required for the fully-connected operation in layer 340. Component 340 includes data size 342, which may represent the size of the matrix or gradient required for the fully-connected operation in layer 340. As discussed above, the number of parameters and the size of the matrix often provide a better indication of the amount of resources (e.g., memory storage) required than the number of weighted operations alone. Component 340 also includes dimension 343 which represents computation complexity in a system-independent manner, such as a number of required computation operations, which may be floating-point operations (FLOPS), as discussed above with reference to FIG. 3A.

FIG. 3D also includes data components 346 and 349, which represent the input and output of component 340, and which may be similar to data component 310 discussed above with reference to FIG. 3A. Note that components 346 and 349 in FIG. 3D have stippling similar to component 310 in FIG. 3A. In particular, input and output data components 346 and 349 in FIG. 3D may each include dimensions 311, 312, and 313 discussed above with reference to FIG. 3A.

Figure 4A:
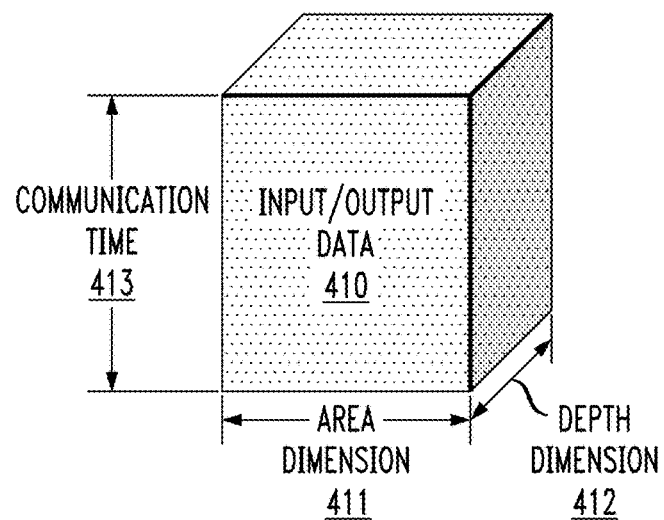
FIGS. 4A-4D show exemplary components within a system-dependent view, according to an illustrative embodiment of the present invention.

FIGS. 4A-4D show exemplary components within a system-dependent view, according to an illustrative embodiment of the present invention. FIG. 4A shows an exemplary system-dependent input/output data component 410, which has stippling. As will be further discussed below with reference to FIGS. 4B-4D, component 410 may represent data input to or output from a layer of a neural network. As will be further discussed below with reference to FIG. 5, component 410 may also represent data output from one layer of a neural network then input into another layer of that neural network. Component 420 includes area dimension 411 and depth dimension 412, which may be similar to the corresponding dimensions 311 and 312 discussed above with reference to FIG. 3A. Component 410 also includes dimension 413, which indicates communication time, which typically varies depending on the specific system and/or network architecture and/or topology used to run the neural network.

Figure 4B:
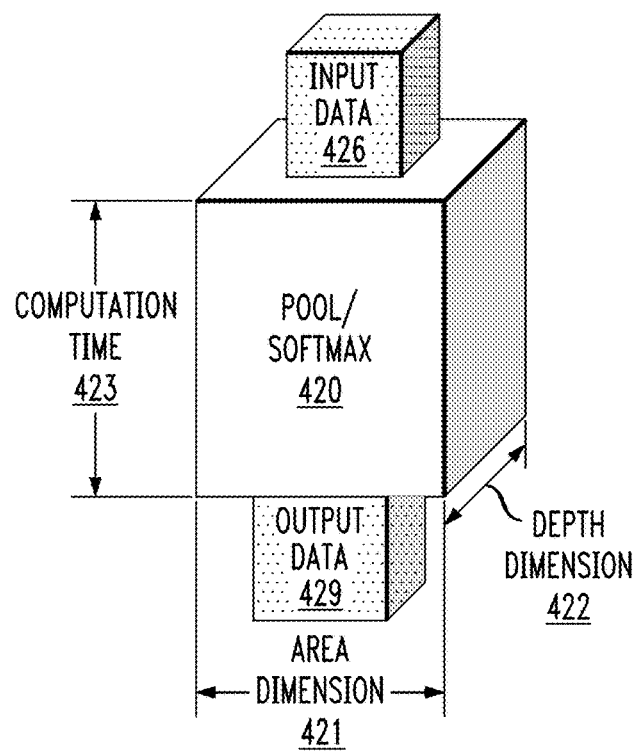

FIG. 4B shows an exemplary system-dependent pool/softmax layer component 420. Component 420 may represent a softmax layer, max pool layer, or average pool layer such as those discussed above with reference to FIGS. 1A and 1B, and/or with reference to the orange and red boxes in FIGS. 2A-2C. Component 420 includes area dimension 421 and depth dimension 422, which may be similar to the corresponding dimensions 311 and 312 discussed above with reference to FIG. 3A. Component 420 also includes dimension 423 which represents computation time, which typically varies depending on the specific system and/or network architecture and/or topology used to run the neural network.

FIG. 4B also includes data components 426 and 429, which represent the input and output of component 420, and which may be similar to data component 410 discussed above with reference to FIG. 4A. Note that components 426 and 429 in FIG. 4B have stippling similar to component 410 in FIG. 4A. In particular, input and output data components 426 and 429 in FIG. 4B may each include dimensions 411, 412, and 413 discussed above with reference to FIG. 4A.

Figure 4C:
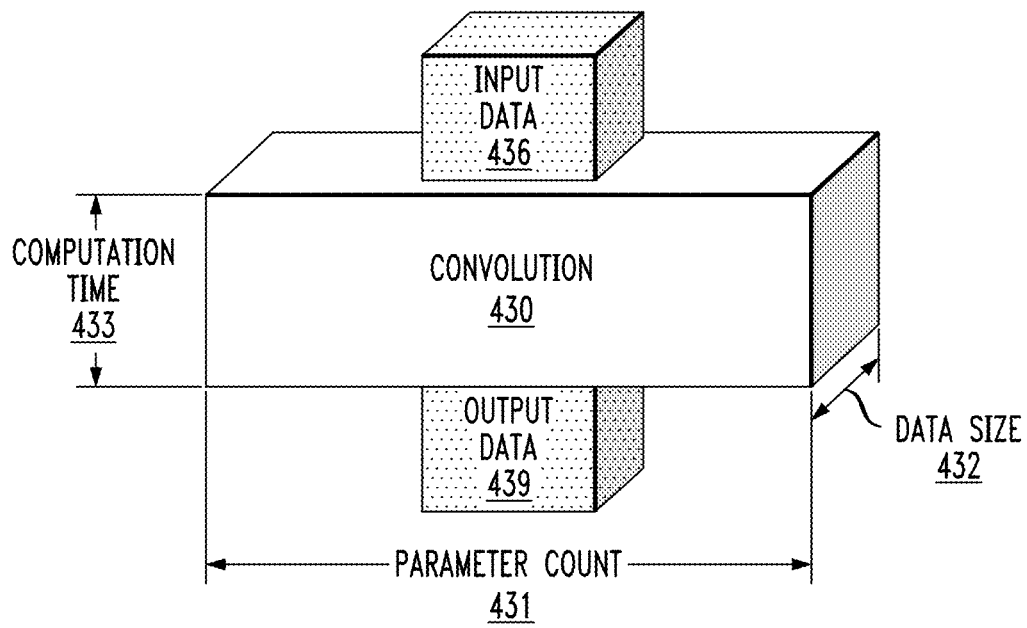

FIG. 4C shows an exemplary system-dependent convolution layer component 430. Component 430 may represent a convolution layer such as 120, 130, 140, 150 and 160 discussed above with reference to FIGS. 1A and 1B and/or as discussed above with reference to FIGS. 2A-2C. Component 430 includes parameter count 431 and data size 432, which may be similar to the corresponding dimensions 331 and 332 discussed above with reference to FIG. 3C. Component 430 also includes dimension 433 which represents computation time, which typically varies depending on the specific system and/or network architecture and/or topology used to run the neural network.

FIG. 4C also includes data components 436 and 439, which represent the input and output of component 430, and which may be similar to data component 410 discussed above with reference to FIG. 4A. Note that components 436 and 439 in FIG. 4B have stippling similar to component 430 in FIG. 4A. In particular, input and output data components 436 and 439 in FIG. 4B may each include dimensions 411, 412, and 413 discussed above with reference to FIG. 4A.

Figure 4D:
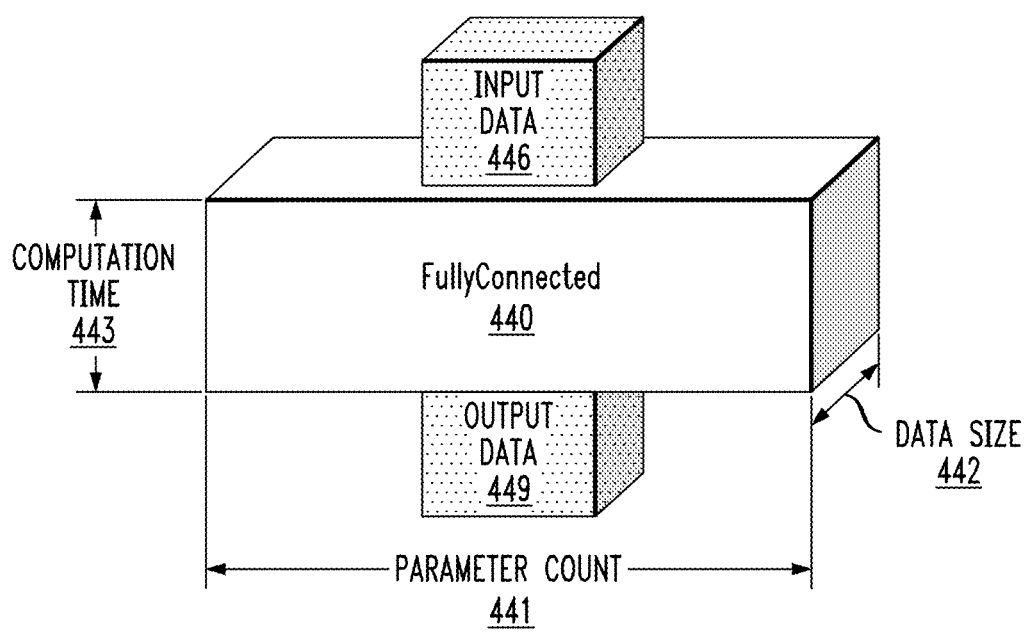

FIG. 4D shows an exemplary system-dependent fully-connected layer component 440. Component 440 may represent a fully-connected layer such as 170, 180 and 190 discussed above with reference to FIGS. 1A and 1B and/or as discussed above with reference to FIGS. 2A-2C. Fully-connected layer component 440 in FIG. 4D includes dimensions similar to convolution layer component 430 in FIG. 3C. Thus, component 440 includes parameter count 441 and data size 442, which may be similar to the corresponding dimensions 341 and 342 discussed above with reference to FIG. 3D. Component 440 also includes dimension 443 which represents computation time, which typically varies depending on the specific system and/or network architecture and/or topology used to run the neural network.

FIG. 4D also includes data components 446 and 449, which represent the input and output of component 440, and which may be similar to data component 410 discussed above with reference to FIG. 4A. Note that components 446 and 449 in FIG. 4D have stippling similar to component 410 in FIG. 4A. In particular, input and output data components 446 and 449 in FIG. 4D may each include dimensions 411, 412, and 413 discussed above with reference to FIG. 4A.

Figure 5:
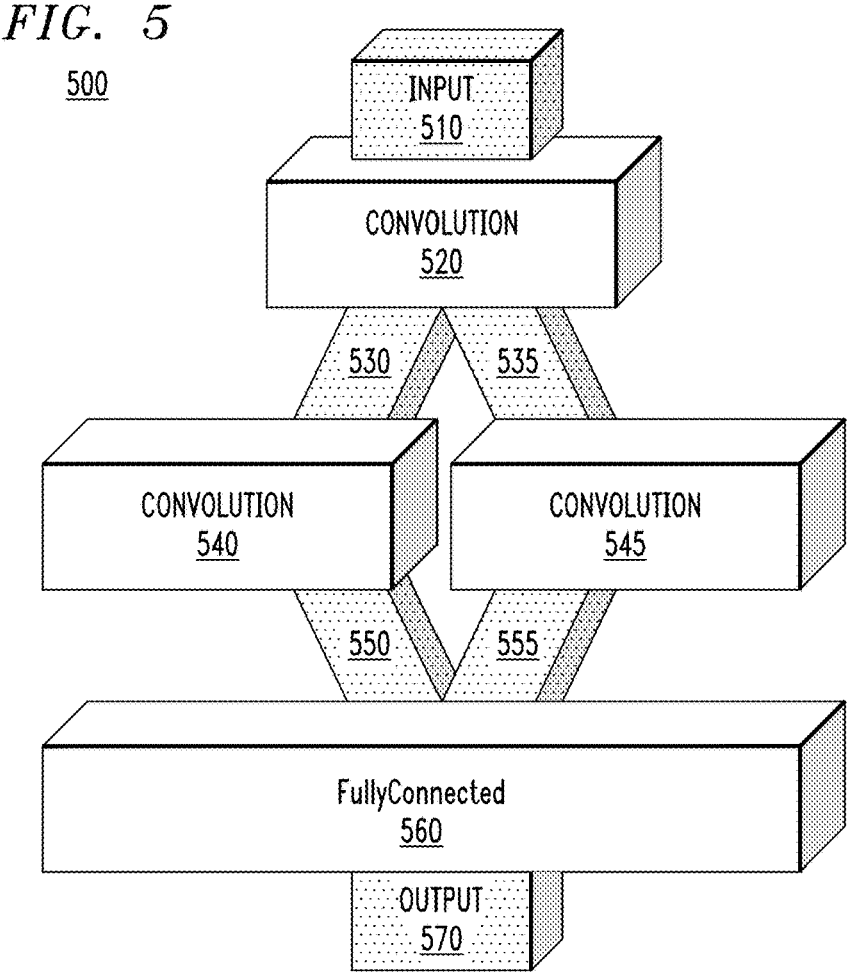
FIG. 5 show an exemplary composition of components, according to an illustrative embodiment of the present invention.

FIG. 5 show an exemplary composition 500 of components, according to an illustrative embodiment of the present invention. Composition 500 shown in FIG. 5 may be either a system-independent view, comprising components discussed above with reference to FIGS. 3A-3D, or a system-dependent view, comprising components discussed above with reference to FIGS. 4A-4D.

Composition 500 begins with input component 510, which represents the data input to composition 500, and more particularly input to convolution component 520. Input component 510 is stippled like component 310 in FIG. 3A and component 410 in FIG. 4A. Thus, input component 510 may be similar to system-independent data component 310 in FIG. 3A (e.g., including dimensions 311, 312, and 313 discussed above with reference to FIG. 3A) or input component 510 may be similar to system-dependent data component 410 in FIG. 4A (e.g., including dimensions 411, 412, and 413 discussed above with reference to FIG. 4A).

Convolution component 520 receives input 510. Convolution component 520 may represent a convolution layer such as 120, 130, 140, 150 and 160 discussed above with reference to FIGS. 1A and 1B and/or as discussed above with reference to FIGS. 2A-2C. Component 520 may be similar to system-independent convolution component 330 in FIG. 3C (e.g., including dimensions 331, 332, and 333 discussed above with reference to FIG. 3C) or component 510 may be similar to system-dependent convolution component 430 in FIG. 4C (e.g., including dimensions 431, 432, and 433 discussed above with reference to FIG. 4C).

Convolution component 520 has an output coupled to data components 530 and 535, which are coupled to respective inputs of parallel convolution components 540 and 545. This indicates that layer 520 provides the same data 530 and 535 to parallel layers 540 and 545. Data components 530 and 535 are each stippled like component 310 in FIG. 3A and component 410 in FIG. 4A. Thus, components 530 and 535 may be similar to system-independent data component 310 in FIG. 3A (e.g., including dimensions 311, 312, and 313 discussed above with reference to FIG. 3A) or components 530 and 535 may be similar to system-dependent data component 410 in FIG. 4A (e.g., including dimensions 411, 412, and 413 discussed above with reference to FIG. 4A).

Convolution components 540 and 545 may represent parallel convolution layers such as 120, 130, 140, 150 and 160 discussed above with reference to FIG. 1B and/or as discussed above with reference to FIGS. 2A-2C. Components 540 and 545 may be similar to system-independent convolution component 330 in FIG. 3C (e.g., including dimensions 331, 332, and 333 discussed above with reference to FIG. 3C) or components 540 and 545 may be similar to system-dependent convolution component 430 in FIG. 4C (e.g., including dimensions 431, 432, and 433 discussed above with reference to FIG. 4C).

Parallel convolution components 540 and 545 have outputs coupled to respective data components 550 and 555, which are both coupled as inputs to fully-connected component 560. Thus, layer 560 concatenates data 550 and 555 from parallel layers 530 and 535 to produce a single result 570.

Data components 550 and 555 are each stippled like component 310 in FIG. 3A and component 410 in FIG. 4A. Thus, components 550 and 555 may be similar to system-independent data component 310 in FIG. 3A (e.g., including dimensions 311, 312, and 313 discussed above with reference to FIG. 3A) or components 550 and 555 may be similar to system-dependent data component 410 in FIG. 4A (e.g., including dimensions 411, 412, and 413 discussed above with reference to FIG. 4A).

Fully-connected component 560 may represent a fully-connected layers such as 170, 180, or 190 discussed above with reference to FIGS. 1A and 1B and/or as discussed above with reference to FIGS. 2A-2C. Component 560 may be similar to system-independent fully-connected component 340 in FIG. 3D (e.g., including dimensions 341, 342, and 343 discussed above with reference to FIG. 3D) or component 560 may be similar to system-dependent fully-connected component 440 in FIG. 4D (e.g., including dimensions 441, 442, and 443 discussed above with reference to FIG. 4D).

Output component 570 is stippled like component 310 in FIG. 3A and component 410 in FIG. 4A. Thus, output component 570 may be similar to system-independent data component 310 in FIG. 3A (e.g., including dimensions 311, 312, and 313 discussed above with reference to FIG. 3A) or output component 570 may be similar to system-dependent data component 410 in FIG. 4A (e.g., including dimensions 411, 412, and 413 discussed above with reference to FIG. 4A).

Typically, the composition 500 shown in FIG. 5 would be implemented in either a system-independent view or a system-dependent view. If composition 500 were implemented in a system-independent view, convolution components 520, 540 and 545 in FIG. 5 would be similar to system-independent convolution component 330 in FIG. 3C (e.g., including dimensions 331, 332, and 333 discussed above with reference to FIG. 3C), while fully-connected component 560 in FIG. 5 would be similar to system-independent fully-connected component 340 in FIG. 3D (e.g., including dimensions 341, 342, and 343 discussed above with reference to FIG. 3D). Similarly, if composition 500 were implemented in a system-independent view, components 510, 530, 535, 550, 555, and 570 would be similar to system-independent data component 310 in FIG. 3A (e.g., including dimensions 311, 312, and 313 discussed above with reference to FIG. 3A).

Conversely, if composition 500 were implemented in a system-dependent view, convolution components 520, 540 and 545 in FIG. 5 would be similar to system-dependent convolution component 430 in FIG. 4C (e.g., including dimensions 431, 432, and 433 discussed above with reference to FIG. 4C), while fully-connected component 560 in FIG. 5 would be similar to system-dependent fully-connected component 440 in FIG. 4D (e.g., including dimensions 441, 442, and 443 discussed above with reference to FIG. 4D). Similarly, if composition 500 were implemented in a system-dependent view, components 510, 530, 535, 550, 555, and 570 would be similar to system-dependent data component 410 in FIG. 4A (e.g., including dimensions 411, 412, and 413 discussed above with reference to FIG. 3A).

One or more embodiments of the invention, or elements thereof, can be implemented, at least in part, in the form of an apparatus including a memory and at least one processor that is coupled to the memory and operative to perform exemplary method steps.

Figure 6:
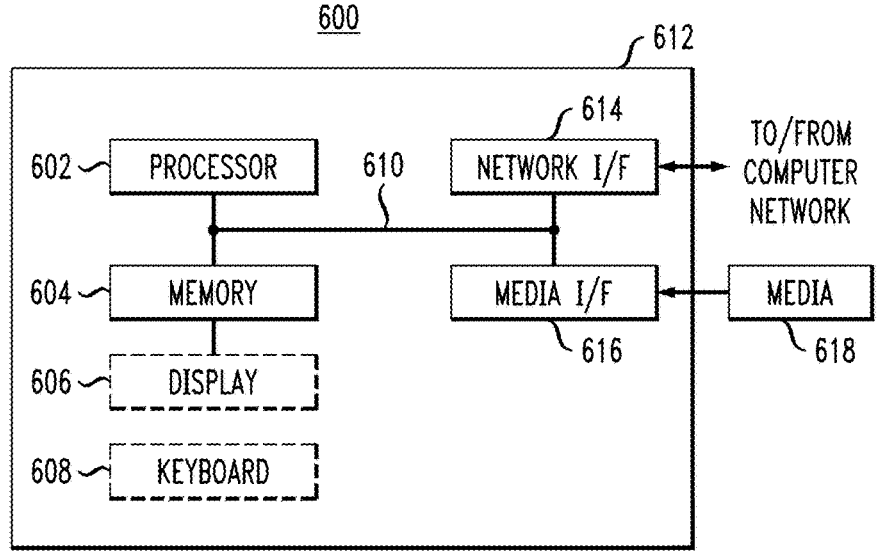
FIG. 6 shows a computer system that may be useful in implementing one or more aspects and/or elements of the invention.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 504 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a graphical visualization of a neural network to a user, the method comprising:
   generating the graphical visualization of the neural network at least in part by:

representing layers of the neural network as respective three-dimensional blocks, wherein at least a first dimension of a given block is proportional to a computational complexity of a layer of the neural network represented by the given block; and representing data flows between the layers of the neural network as respective three-dimensional structures connecting blocks representing the layers of the neural network, wherein a first dimension of a given structure is proportional to each of a first dimension and a second dimension of a data flow represented by the given structure; and displaying the graphical visualization of the neural network to the user;

wherein the given structure uses two dimensions to represent three dimensions of the data flow represented by the given structure; and wherein a third dimension of the given structure can be interactively manipulated by the user when the graphical visualization is displayed.

2. The method of claim 1, wherein the first dimension of the given structure is proportional to a product of the first dimension and the second dimension of the data flow represented by the given structure.

3. The method of claim 1, wherein a second dimension of the given structure is proportional to a third dimension of the data flow represented by the given structure.

4. The method of claim 1, wherein the first dimension of the given structure is proportional to an area dimension of the data flow represented by the given structure, and wherein the second dimension of the given structure is proportional to a depth dimension of the data flow represented by the given structure.

5. The method of claim 1, wherein at least a second dimension of the given block is proportional to a parameter count of the layer represented by the given block.

6. The method of claim 1, wherein at least a second dimension of the given block is proportional to a data size of the layer represented by the given block.

7. The method of claim 1, wherein representing the operations of the neural network as respective three-dimensional blocks, wherein at least a first dimension of a given block is proportional to a computational complexity of an operation of the neural network represented by the given block further comprises:

representing at least one of convolution and fully-connected layers of the neural network as respective three-dimensional blocks wherein a second dimension of the given block is proportional to a parameter count of the layer represented by the given block and wherein a third dimension of the given block is proportional to a data size of the layer represented by the given block; and representing at least one of pool and softmax layer of the neural network as respective three-dimensional blocks wherein a second dimension of the given block is proportional to an area dimension of the layer represented by the given block and wherein a third dimension of the given block is proportional to a depth dimension of the layer represented by the given block.

8. The method of claim 1, wherein the first dimension of the given block is proportional to a number of computational operations for the layer represented by the given block.

9. The method of claim 1, wherein the first dimension of the given block is proportional to a number of floating-point operations (FLOPS) for the layer represented by the given block.

10. The method of claim 1, wherein the first dimension of the given block is proportional to a computation time for the layer represented by the given block.

11. The method of claim 1, wherein at least a second dimension of the given structure is proportional to a communication time for the layer represented by the given block.

12. The method of claim 1, further comprising selecting one of a plurality of modes for the visualization, the plurality of modes comprising:

a first visualization mode, wherein the first dimension of the given block is proportional to a number of computational operations for the layer represented by the given block; and a second visualization mode, wherein the first dimension of the given block is proportional to a computation time for the layer represented by the given block.

13. The method of claim 12, wherein in the first visualization mode, the first dimension of the given block is proportional to a number of floating-point operations (FLOPS) for the layer represented by the given block.

14. The method of claim 12, wherein in the second visualization mode, at least a second dimension of the given structure is proportional to a communication time for the layer represented by the given block.

15. The method of claim 12, wherein the first visualization mode comprises a system-independent view of the neural network, and wherein the second visualization mode comprises a system-dependent view of the neural network.

16. The method of claim 1, wherein each of the blocks within the visualization is coupled to at least a first structure representing an input data flow and at least a second structure representing an output data flow.

17. The method of claim 16, wherein the given block is coupled to at least three structures, representing at least one of multiple input data flows and multiple output data flows for the layer represented by the given block.

18. The method of claim 1, wherein parallel layers are represented by adjacent blocks with no structure therebetween.

19. An apparatus comprising:
a memory; and
at least one processor coupled to the memory, the processor being operative:
to generate a graphical visualization of a neural network at least in part by:
representing layers of the neural network as respective three-dimensional blocks, wherein at least a first dimension of a given block is proportional to a computational complexity of a layer of the neural network represented by the given block; and
representing data flows between the layers of the neural network as respective three-dimensional structures connecting blocks representing the layers of the neural network, wherein a first dimension of a given structure is proportional to each of a first dimension and a second dimension of a data flow represented by the given structure; and
to display the graphical visualization of the neural network to a user;
wherein the given structure uses two dimensions to represent three dimensions of the data flow represented by the given structure; and
wherein a third dimension of the given structure can be interactively manipulated by the user when the graphical visualization is displayed.

20. A computer program product comprising a non-transitory machine-readable storage medium having machine-readable program code embodied therewith, said machine-readable program code comprising machine-readable program code configured:
- to generate a graphical visualization of a neural network at least in part by:
  - representing layers of the neural network as respective three-dimensional blocks, wherein at least a first dimension of a given block is proportional to a computational complexity of a layer of the neural network represented by the given block; and
  - representing data flows between the layers of the neural network as respective three-dimensional structures connecting blocks representing the layers of the neural network, wherein a first dimension of a given structure is proportional to each of a first dimension and a second dimension of a data flow represented by the given structure; and
- to display the graphical visualization of the neural network to a user;
- wherein the given structure uses two dimensions to represent three dimensions of the data flow represented by the given structure; and
- wherein a third dimension of the given structure can be interactively manipulated by the user when the graphical visualization is displayed.

\* \* \* \* \*